3,454,528
Patented July 8, 1969

3,454,528
PROCESS FOR THE MANUFACTURE OF COPOLYMERS OF TRIOXANE
Karl-Heinz Häfner, Bad Orb, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 17, 1966, Ser. No. 558,248
Claims priority, application Germany, June 30, 1965,
F 46,475
Int. Cl. C08g 1/14, 1/10
U.S. Cl. 260—67          10 Claims

ABSTRACT OF THE DISCLOSURE

A polyoxyalkylene copolymer having pendant free aldehyde groups spaced along the polymer chain thereof is disclosed. The copolymer is essentially composed of units derived from 70 to 99.99% by weight, based on the total weight of monomer, of trioxane, 0 to 10% by weight of a cyclic ether and 0.01 to 20% by weight of a bifunctional compound of the formula

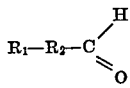

in which $R_1$ represents a 2,3-epoxy-propyloxy radical or a 1,3-dioxolano-4-methyloxy radical and $R_2$ stands for an aromatic hydrocarbon radical with 6 or 10 carbon atoms which is substituted by $(A)_x$ and/or $(B)_y$, A being an alkyl radical with 1 to 6 carbon atoms, B being an alkoxy radical with 1 to 6 carbon atoms, $x$ being zero or a whole number within the range of 1 to 4, $y$ being zero or a whole number within the range of 1 to 4 and $x+y$ being smaller than 5. The copolymers may be prepared by polymerizing the monomers in the presence of cationic catalysts at temperatures of —50° to 110° C. The copolymers are heat resistant and can be used in the manufacture of thermoplastic adhesives and as coating compounds for metals.

---

The present invention relates to a process for the manufacture of copolymers of trioxane.

It is known that trioxane can be reacted in the presence of cationic catalysts with cyclic ethers having a least two neighbouring carbon atoms in the ring to obtain copolymers which are stable against alkaline degradation and make valuable plastics because of their good mechanical and physical properties. Such copolymers have the disadvantage, however, that they cannot subsequently be modified in the chain by chemical reactions, except for chemical stabilizing reactions at the end of the polymer chain. It has also been proposed to copolymerize trioxane with bifunctional compounds such as cyclohexene-1,2-oxide-4,4-dioxymethyleneformal and β,γ-epoxypropoxy-β',γ'-carbonato-propoxyalkanes, whereby polymers are obtained which are cross-linked under the polymerization conditions already or during subsequent heat treatment.

Now we have found that copolymers of 70 to 99.99% by weight of trioxane, 0.01 to 20% by weight of bifunctional compounds and 0 to 10% by weight of cyclic ethers can be obtained in advantageous manner in the presence of cationic catalysts at temperatures within the range of from —50° to +110° C., by using bifunctional compounds of the formula

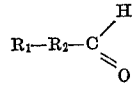

in which $R_1$ represents a 2,3-epoxy-propyloxy radical or a 1,3-dioxolano-4-methyloxy radical and $R_2$ stands for an aromatic hydrocarbon radical with 6 or 10 carbon atoms which is substituted by $(A)_x$ and/or $(B)_y$, A being an alkyl radical with 1 to 6 carbon atoms, B an alkoxy radical with 1 to 6 carbon atoms, $x$ being zero or a whole number within the range of 1 to 4, $y$ being zero or a whole number within the range of 1 to 4 and $x+y$ being smaller than 5.

Examples of suitable bifunctional compounds are p-glycidoxybenzaldehyde, o-glycidoxybenzaldehyde and 4-glycidoxy-1-naphthaldehyde.

In addition to trioxane and bifunctional compounds, cyclic ethers may be used in an amount within the range of 0 to 10% calculated on the weight of the total monomer mixture. Examples of suitable cyclic ethers are ethylene oxide, propylene oxide, epichlorhydrin, 1,4-butanediolformal, diethyleneglycolformal, 1,4 - butenediolformal, 1,4-butanedioldiglycidyl ether, oxacyclobutane and 1,3-dioxolane.

The process of the invention yields copolymers in which the comonomer containing the free aldehyde group is incorporated in the macromolecular chain. For example, copolymers of trioxane, ethylene oxide and p-glycidoxybenzaldehyde which have been subjected to an alkaline treatment in benzyl alcohol at 150° C. and then boiled several times with methanol, show the carbonyl band characteristic of benzaldehyde in the infrared spectrum. Copolymers of trioxane and ethylene oxide which have been subjected to an alkaline treatment with benzyl alcohol at 150° C. and boiled several times with methanol show no carbonyl band. In a copolymer of 100 parts by weight of trioxane, 2 parts by weight of ethylene oxide and 5 parts by weight of p-glycidoxybenzaldehyde, for example, which had been treated at 150° C. with benzyl alcohol and boiled several times with methanol, 2.6% by weight of incorporated p-glycidoxybenzaldehyde could be traced by quantitative evaluation of the infrared spectrum. After these copolymers containing aldehyde groups have been treated with oxidizing agents in the presence of sodium hydroxide solution, the carbonyl band of benzaldehyde in the infrared spectrum disappears and the corresponding carboxylate band appears. Another proof of the presence of free aldehyde groups in the copolymer are the pronounced hydrophilic properties after condensation with malonic acid.

The copolymers obtained by the process of the invention can be chemically modified by subsequent treatment with agents reacting with free aldehyde groups. The free aldehyde groups in the polymer chain can be converted, for example, with appropriate oxidizing agents into carboxyl groups and in the presence of a base into carboxylate groups. Furthermore, the aldehyde groups are susceptible to reactions of the type of a Knoevenagel-Döbner-condensation (cf. Wagner-Zook, Synthetic Organic Chemistry, 3rd edition, 1961, edited by John Wiley and Sons, Inc., New York, London, p. 52).

The cationic polymerization may be carried out according to known methods in the melt, in solution or in suspension. As solvents or dispersing agents there may be used aliphatic or cycloaliphatic hydrocarbons with 5 to 18 carbon atoms that are inert toward the monomers and the catalyst, for example, n-hexane or cyclo-hexane. The polymerization is advantageously carried out in the melt at temperatures within the range of from +60° to +110° C.

For starting the copolymerization in accordance with the invention, it is particularly suitable to use Lewis acids (for a definition of Lewis acids see Kortüm, Lehrbuch der Elektrochemie, Wiesbaden 1948, pp. 300 and 301), preferably boron fluoride. The latter is advantageously used in the form of its complex compounds, for example, in the form of an etherate, oxonium fluoroborate or a substituted aryldiazonium fluoroborate. The concentration of the catalyst depends primarily on the efficacy of the catalyst as a polymerization initiator and may be within the range of from 0.0001 to 1.0% calculated on the total weight of the monomer mixture.

To remove unstable terminal semi-acetal groups, the copolymers obtained by the process of the invention may be subjected to an alkaline degradation known in itself (cf. Belgian Patent No. 617,897). It is advantageous to add to the copolymers also a known light or oxidation stabilizer.

The copolymers obtained by the process of the invention are heat resistant and can be worked in the thermoplastic range. They may be used for the manufacture of thermoplastic adhesives, as coating compounds for metals and for the preparation of dispersions.

The following examples serve to illustrate the invention, but are not intended to limit it.

EXAMPLE 1

20 cc. of boron fluoride dibutyl etherate which had been diluted with cyclohexane to obtain a ratio of 1:40, were added as a catalyst to a batch consisting of 1,000 g. of trioxane, 20 g. of ethylene oxide and 50 g. of p-gylcidoxybenzaldehyde. The batch was then polymerized in a closed vessel on a thermoconstant bath of 70° C. The polymerization time was 30 minutes. The block of polymer so obtained was ground and treated for 30 minutes at 150° C. with benzyl alcohol containing 1% by weight of triethanolamine to remove unstable terminal semi-acetal groups and residual monomers. After cooling, the polymer was suction-filtered, boiled several times with methanol and dried in vacuo at 50° to 70° C. The polymer was obtained in a yield of 685 g.

The polymer had a reduced specific viscosity $\eta_{red.}$ of 0.33. To measure the reduced specific viscosity, 50 mg. of polymer were dissolved at 140° C. in 10 cc. of butyrolactone containing 0.2% dicyanodiamide and the viscosity was determined at said temperature. The heat stability $K_D$ was 0.0209% per minute. To determine the heat stability, a sample of the polymer was stabilized with 0.7% by weight of 2,2-methylene-bis-4-methyl-6-tert. butylphenol and 0.2% by weight of dicyanodiamide and then subjected for 45 minutes to thermal degradation at 230° C.

EXAMPLE 2

In a manner analogous to Example 1, 1,000 g. of trioxane, 20 g. of ethylene oxide and 10 g. of p-glycidoxybenzaldehyde were polymerized in the presence of 15 cc. of boron fluoride dibutyl etherate (1:40). The yield after alkaline degradation was 632 g.

The following values were found: reduced specific viscosity $\eta_{red.}=0.41$; heat stability $K_D=0.0281$.

EXAMPLE 3

In a manner analogous to Example 1, 100 g. of trioxane, 2 g. of ethylene oxide and 3 g. of o-glycidoxybenzaldehyde were polymerized in the presence of 4 cc. of boron fluoride dibutyl etherate (1:40). The yield after alkaline degradation was 62 g.

Reduced specific viscosity $\eta_{red.}=0.32$.

EXAMPLE 4

In a manner analogous to Example 1, 100 g. of trioxane, 2 g. of ethylene oxide and 3 g. of m-glycidoxybenzaldehyde were polymerized in the presence of 1 cc. of boron fluoride di-n-butyl etherate (1:40). The yield after alkaline degradation was 70 g.

Reduced specific viscosity $\eta_{red.}=0.50$; heat stability $K_D=0.0196$.

EXAMPLE 5

In a manner analogous to Example 1, 100 g. of trioxane, 2 g. of ethylene oxide and 5 g. of 3-methoxy-4-glycidoxybenzaldehyde were polymerized in the presence of 2 cc. of boron fluoride di-n-butyl etherate (1:40). The yield after alkaline degradation was 48 g.

Reduced specific viscosity $\eta_{red.}=0.26$; heat stability $K_D=0.0492$.

EXAMPLE 6

In a manner analogous to Example 1, 100 g. of trioxane, 2 g. of ethylene oxide and 2 g. of 3-methyl-6-glycidoxybenzaldehyde were polymerized in the presence of 1 cc. of boron fluoride di-n-butyl etherate (1:40). The yield after alkaline degradation was 45 g.

Reduced specific viscosity $\eta_{red.}=0.54$; heat stability $K_D=0.0319$.

What is claimed is:

1. In a process for the manufacture of copolymers of 70 to 99.99% by weight of trioxane, 0.01 to 20% by weight of bifunctional compounds and 0 to 10% by weight of oxygen-containing cyclic ethers in the presence of cationic catalysts at temperatures within the range of from −50° to +110° C., the improvement which comprises using a bifunctional compound of the formula

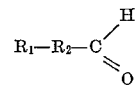

in which $R_1$ represents a 2,3-epoxy-propyloxy radical or a 1,3-dioxolano-4-methyloxy radical and $R_2$ stands for an aromatic hydrocarbon radical with 6 or 10 carbon atoms which is substituted by $(A)_x$ and/or $(B)_y$, A being an alkyl radical with 1 to 6 carbon atoms, B being an alkoxy radical with 1 to 6 carbon atoms, $x$ being zero or a whole number within the range of 1 to 4, $y$ being zero or a whole number within the range of 1 to 4 and $x+y$ being smaller than 5.

2. A polyoxyalkylene copolymer having free aldehyde groups spaced along the polymer chain thereof, said copolymer being essentially composed of units derived from 70% to 99.99% by weight, based on the total weight of monomer, of trioxane, 0 to 10% by weight of oxygen-containing cyclic ethers and 0.01 to 20% by weight of a bifunctional compound of the formula

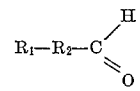

in which $R_1$ is a 2,3-epoxy-propyloxy radical or a 1,3-dioxolano-4-methyloxy radical and $R_2$ is an aromatic hydrocarbon radical with 6 or 10 carbon atoms which is substituted by $(A)_x$ and/or $(B)_y$, A being an alkyl radical with 1 to 6 carbon atoms, B being an alkoxy radical with 1 to 6 carbon atoms, $x$ being 0 to 4, $y$ being 0 to 4 and $x+y$ being less than 5.

3. A process according to claim 1 wherein said bifunctional compound is glycidoxybenzaldehyde.

4. A process according to claim 1 wherein said bifunctional compound is 3-methoxy-4-glycidoxybenzaldehyde.

5. A process according to claim 1 wherein said bifunctional compound is 3-methyl-6-glycidoxybenzaldehyde.

6. A process according to claim 1 wherein said bifunctional compound is 4-glycidoxy-1-naphthaldehyde.

7. A polyoxyalkylene copolymer according to claim 2 wherein said bifunctional compound is glycidoxybenzaldehyde.

8. A polyoxyalkylene copolymer according to claim 2 wherein said bifunctional compound is 3-methoxy-4-glycidoxybenzaldehyde.

9. A polyoxyalkylene copolymer according to claim 2 wherein said bifunctional compound is 3-methyl-6-glycidoxybenzaldehyde.

10. A polyoxyalkylene copolymer according to claim 2 wherein said bifunctional compound is 4-glycidoxy-1-naphthaldehyde.

References Cited

UNITED STATES PATENTS

| | | | |
|---|---|---|---|
| 3,272,780 | 9/1966 | Wilson et al. | 260—73 |
| 3,275,604 | 9/1966 | Kray et al. | 260—67 |
| 3,293,219 | 12/1966 | Gottesman et al. | 260—67 |
| 3,346,539 | 10/1967 | Rosen | 260—67 |

WILLIAM H. SHORT, *Primary Examiner.*

L. M. PHYNES, *Assistant Examiner.*